United States Patent
Sunkara et al.

(10) Patent No.: US 7,591,897 B2
(45) Date of Patent: *Sep. 22, 2009

(54) METHOD FOR THE RAPID SYNTHESIS OF LARGE QUANTITIES OF METAL OXIDE NANOWIRES AT LOW TEMPERATURES

(75) Inventors: Mahendra Kumar Sunkara, Louisville, KY (US); Sreeram Vaddiraju, Mountain View, CA (US); Miran Mozetic, Ljubljan (SI); Uros Cvelbar, Idrija (SI)

(73) Assignee: University of Louisville Research Foundation, Inc., Louisville, KY (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/385,015

(22) Filed: Mar. 20, 2006

(65) Prior Publication Data

US 2007/0118938 A1    May 24, 2007

Related U.S. Application Data

(60) Provisional application No. 60/664,045, filed on Mar. 22, 2005.

(51) Int. Cl.
- C30B 13/00 (2006.01)
- C30B 21/04 (2006.01)
- C30B 28/08 (2006.01)
- C30B 23/00 (2006.01)
- C30B 25/00 (2006.01)
- C30B 28/12 (2006.01)
- C30B 28/14 (2006.01)

(52) U.S. Cl. .................. 117/108; 117/45; 117/84; 117/85; 117/103; 117/109; 117/944; 977/844

(58) Field of Classification Search .............. 423/592.1; 977/811; 117/40, 45, 50, 84, 85, 86, 103, 117/108, 109, 944
See application file for complete search history.

(56) References Cited

U.S. PATENT DOCUMENTS

| | | | |
|---|---|---|---|
| 6,632,528 B1* | 10/2003 | Clough | 428/402 |
| 6,806,228 B2* | 10/2004 | Sharma et al. | 502/439 |
| 7,182,812 B2* | 2/2007 | Sunkara et al. | 117/103 |
| 7,217,407 B2* | 5/2007 | Zhang | 423/610 |
| 2005/0119398 A1* | 6/2005 | Zhang | 524/497 |

(Continued)

OTHER PUBLICATIONS

U. Cvelbar, M Mozetic. Behaviour of oxygen atams near the surface of nanostructured Nb2O5. Nov. 9, 2006. J. Phys. D: Appl. Phys. 40: 2300-2303.*

(Continued)

*Primary Examiner*—Jerry Lorengo
*Assistant Examiner*—Jennifer A Smith
(74) *Attorney, Agent, or Firm*—Stites & Harbison PLLC; Robert C. Yang

(57) ABSTRACT

A process for the rapid synthesis of metal oxide nanoparticles at low temperatures and methods which facilitate the fabrication of long metal oxide nanowires. The method is based on treatment of metals with oxygen plasma. Using oxygen plasma at low temperatures allows for rapid growth unlike other synthesis methods where nanomaterials take a long time to grow. Density of neutral oxygen atoms in plasma is a controlling factor for the yield of nanowires. The oxygen atom density window differs for different materials. By selecting the optimal oxygen atom density for various materials the yield can be maximized for nanowire synthesis of the metal.

18 Claims, 15 Drawing Sheets

U.S. PATENT DOCUMENTS

2005/0271815 A1* 12/2005 Delaunay et al. ......... 427/249.1
2007/0118938 A1* 5/2007 Sunkara et al. ............ 977/811

OTHER PUBLICATIONS

Zhang et al. "Growth of vertically aligned carbon-nanotube array on large area of quartz plates by chemical vapor deposition". Appl. Phys. A 74, 419-422 (2002).*

Babic et al., Fiber Optic Catalytic Probe for Weakly Ionized Oxygen Plasma Characterization, Review of Scientific Instruments, Nov. 2001, pp. 4110-4114, vol. 72 No. 11, U.S.

Vaddiraju, et al., Vapor Phase Synthesis of Tungsten Nanowires, JACS, Aug. 16, 2003, pp. 10792-10793, vol. 125 No. 36, U.S.

Holmes et al., Control of Thickness and Orientation of Solution-Grown Silicon Nanowires, Science, Feb. 25, 2000, pp. 1471-1473, vol. 287, U.S.

Zhu et al., Tungsten Oxide Tree-Like Structures, Chemical Physics Letters, Aug. 20, 1999, pp. 327-334, vol. 309, U.S.

Sharma et al., Direct Synthesis of Gallium Oxide Tubes, Nanowires, and Nanopaintbrushes, JACS, Sep. 20, 2002, pp. 12288-12293, vol. 124 No. 41, U.S.

Mozetic et al., Comparison of NO titration and fiber optics catalytic probes for determination of neutral oxygen atom concetration in plasmas and postglows, JVST. Mar./Apr. 2003 pp. 369-374, vol. 21 No. 2, U.S.

A.P. Alivisatos, Semiconductor Clusters, Nanocrystals, and Quantum Dots, Science, Feb. 16, 1996, vol. 271, p. 933-937.

A.M. Saitta, F. Buda, G. Fiumara, P.V. Giaquinta, Ab initio molecular-dynamics study of electronic and optical properties of silicon quantum wires: Orientational effects, Physical Review B, Jan. 15, 1996; vol. 53, No. 3, 1446-1451.

R.S. Wagner and W.C. Ellis, Vapor Liquid Solid Mechanism fo Single Crystal Growth, Applied Physics Letters, Mar. 1, 1964, vol. 4, No. 5, pp. 89-90.

Alfredo M. Morales and Charles M. Lieber, A Laser Ablation Method for the Synthesis of Crystalline Semiconductor Nanowires, Science, Jan. 9, 1998, vol. 279, No. 9, pp. 208-211.

Y.H. Tang, Y.F. Zhang, H.Y. Peng, N. Wang, C.S. Lee, and S.T. Lee, Si Nanowires Synthesized by Laser Ablation of Mixed SiC and SiO2 Powders, Chemical Physics Letters, Nov. 26, 1999 vol. 314, pp. 16-20.

M.K. Sunkara, S. Sharma, and R. Miranda, Bulk Synthesis of Silicon Nanowires Using a Low-temperature Vapor-Liquid-Solid Method, Applied Physics Letters, Sep. 3, 2001, vol. 79, No. pp. 1546-1548.

* cited by examiner

METHOD FOR THE RAPID SYNTHESIS OF LARGE QUANTITIES OF METAL OXIDE NANOWIRES AT LOW TEMPERATURES

This application claims priority from copending U.S. Provisional Application Ser. No. 60/664,045 filed on Mar. 22, 2005 which is incorporated by reference herein.

This application is part of a government project. The research leading to this invention was support by Grant Number 987 6251 from the National Science Foundation, Grant Number F49620-00-1-0310 from the Air Force Office of Scientific Research and Grant Number DE-FG-02-05ER64071 from the Department of Energy. The United States Government retains certain rights in this invention.

BACKGROUND OF THE INVENTION

1. Field of the Invention

The invention relates to the field of rapid synthesis of metal oxide nanoparticles and more particularly nanowires at low temperatures utilizing oxygen plasma for rapid growth and optimizing the density of the neutral oxygen atoms in the plasma for different materials to maximize growth parameters.

2. Description of the Prior Art

Metal oxide nanoparticles have great potential for application in medicine, biotechnology, microelectronics and chemical industry. Nanostructural materials have typical side dimension below 200 nm, while the longitudinal dimension is often orders of magnitude larger. They appear in different forms including spheres, tubes, wires, and more complex shape (onion-like, stars, spikes etc.) The characteristics of nanostructured materials are often different from characteristics of parent bulk materials. Many nanostructured materials are made from carbon, but in recent years nanomaterials made from metals, insulators, semiconductors and other materials have been reported. Nanomaterials made from the following elements and their compounds have been reported: Ag, Au, Pt, Fe, Ni, Co, Si, Pd, Mo, Ga, O, S, N.

A variety of methods for synthesis nanomaterials have been reported. Many are based on deposition from the vapor phase. A popular method is also the growth by using small islands of low melting point materials deposited on substrates. Most methods are based on application of conditions close to thermodynamic equilibrium. Non equilibrium methods often apply electrical discharges where the material that is to be deposited is evaporated and partially ionized. A classical discharge is an electric arc. A typical temperature in the arc is several 1000K, so solid materials placed into the ac are evaporated. The vapor is condensed on appropriate substrate and under certain conditions (temperature, pressure, morphology) they condensate in the form of nanostructures. Another commonly used method is based on classical heating in a furnace. In this case the material is evaporated and condensed on cooled substrate so that nanomaterials are formed. Different catalysts are often applied in order to facilitate one-dimensional growth. The deposition rate is often small due to limitation of the process: at higher deposition rates the growth unisotropy is usually lost.

Some metals such as niobium are often used as a catalyst (ie condensation, nuclei) during vapor phase deposition of nanomaterials suitable for storage high quantity of hydrogen (WO001865821), (WO9965821), (WO9965821). In such examples hydrocarbons are passed through a discharge where they are dehydrogenized. The modified hydrocarbons are condensed on substrates and nanomaterial is formed. The dimensions as well as structure of such carbon nanoparticles depend on discharge conditions. Similar procedure is used in (US Patent Publication 200211494, TW444067, WO0234669, EP1046613, WO0185612, EP1129990, WO9842621, WO03062146, and US Patent Publication 20030082094). Plasma is also used for functionalization of the surface of carbon nanostructured materials, such as tubes and wires to improve electrical as well as mechanical properties. Such materials may be used in cold emitter devices or atomic force microscopes (WO0180273, WO0131673).

Apart from carbon nanowires, (US Patent Publication 2003044608, U.S. Pat. No. 6,465,132, US Patent Publication 2002117659, US Patent Publication 20010511367, WO03057620), reports have been on polymer nanowires for pharmaceutical application (US Patent Publication 2002055239, (EP1215199, EP1209695). Other materials suitable for synthesis of nanowires include Si, Ge, SiO (US Patent Publication 2002129761), Au (U.S. Pat. No. 6,413,880), Bi, Ga, In (U.S. Pat. No. 6,359,288), Si (U.S. Pat. No. 6,313,015), Pd, Cu, Au, Ni, Pt, (WO03008954), Pt, Fe, Co, Ni, Au, Ag, Pt, Co, their oxides in alloys including FeCo, NiFe, AuAg, CuNi (US Patent Publication 2002187504), Si and SiGe (US Patent Publication 2002175408, Bi (US Patent Publication 200217590). Plasma is also used for synthesis dust nanoparticles (WO03095360), for instance $TiO_2$ (WO02086179).

All of the patents cited above claim synthesis of nanomaterials that is either carried out at- or close to-thermodynamic equilibrium, or at non-equilibrium from the vapor phase and application of appropriate catalyst US Patent Publication 20030039602. There is no report on synthesis nanomaterials directly from the solid material under non-equilibrium conditions, apart from the current co-inventors Slovenia Patent SI21136 published on Aug. 31, 2003 and hereby incorporated by reference.

SUMMARY OF THE INVENTION

This invention relates to metal oxide nanoparticles, and, more particularly to methods which facilitate the fabrication of long metal oxide nanowires. The method is based on treatment of metals with oxygen plasma and selection of optimal processing parameters based on selection of oxygen densities.

A process for the rapid synthesis of metal oxide nanoparticles at low temperatures and methods which facilitate the fabrication of long metal oxide nanowires. The method is based on treatment of metals with oxygen plasma. Using oxygen plasma at low temperatures allows for rapid growth unlike other synthesis methods where nanomaterials take a long time to grow. Density of neutral oxygen atoms in plasma is a controlling factor for the yield of nanowires. The oxygen atom density window differs for different materials. By selecting the optimal oxygen atom density for various materials the yield can be maximized for nanowire synthesis of the metal.

The present invention provides for a method for synthesis of metal oxide nanoparticles, comprising the steps of selecting a metal substrate which may be in the form of a metal foil, wire, thin sheet, metal powder, metal filings, metal film on nonmetal substrate (ceramic, silicon, etc.), selecting a neutral oxygen density range for the selected metal substrate, heating the metal substrate at a temperature between 50° C. and the temperature of the boiling point of the metal substrate, subjecting the metal substrate with an oxygen plasma produced from neutral oxygen atoms having a density in a selected range selected for the metal substrate, and exposing the selected metal substrate to radicals formed in the oxygen of a selected range forming metal oxide crystal nanoparticles in layers.

Moreover, the process is a method for synthesis of metal oxide nanoparticles, the method comprising the steps of selecting a metal substrate, creating a heavily non-equilibrium gas comprising oxygen plasma heating the metal substrate in order to have a temperature at the surface of the metal substrate of from 50° C. to the boiling point of the metal substrate, selecting a density of neutral oxygen atoms in the oxygen plasma in a range effective for the selected metal substrate, exposing the metal substrate to the oxygen plasma having neutral oxygen atoms in a selected density range for the selected metal substrate, forming a nanomaterial comprising a nanostructure metal oxide of the selected metal substrate. While the oxygen plasma may exceed the temperature at the surface of the metal substrate, it is not necessary to heat the metal substrate to cause the diffusion of the metal ions. Typically the boiling point of the metal will be less than 500° C., more typically between 50° C. and 350° C., and often in a range of from 50 to 200° C. In the instant application, the oxygen plasma heated the surface of the substrate to a temperature of about 50° C. to obtain metal oxide nanoparticles.

It is an object of the present invention to provide that the metal substrate may be substituted with two or more metals substrates or their alloys.

It is an object of the present invention to include the step of controlling the growth rate of the nanomaterial by selecting the density of the oxygen plasma.

It is an object of the present invention to provide oxygen plasma generated in any kind of gaseous discharge including the DC, the radio frequency, and the microwave discharge in any gas or gas mixture, preferably in oxygen, ozone, water, vapor, hydrogen peroxide, air, carbon oxides, or any mixture of gases, or a mixture of gases with a noble gas.

It is an object of the present invention wherein the temperature of the metal substrate is between room temperature and the boiling point of the metal substrate.

It is an object of the present invention to further comprise the step of adjusting the temperature of the method by either by cooling or heating a substrate holder, and/or by treatment of the metal substrate with an electron gun, an ion gun or a laser.

It is an object of the present invention to provide that during the metal substrate treatment with the oxygen plasma there is a temperature gradient between the surface of the selected metal substrate facing the oxygen plasma and a surface of the metal substrate facing a sample holder and the temperature of the surface of the metal substrate facing the sample holder is lower than the temperature of the surface of the metal substrate facing the oxygen plasma.

It is an object of the present invention to provide that the metal substrate has a BCC crystalline structure.

It is an object of the present invention to provide that the nanostructure metal oxide has a BCC crystalline structure of the metal substrate.

These and other objects of the present invention will be more fully understood from the following description of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

In order to synthesize metal oxide nanoparticles, metals are exposed to a heavily non-equilibrium state of gas. Such a state of gas is often (but not always) created in plasma. Plasma is generated by different means including gaseous discharges. A variety of discharges may be used including different DC discharges and low frequency as well as high frequency AC discharges. Examples of discharges include a glow discharge, a hot-cathode discharge, a hollow-cathode discharge, a ECR discharge, a laser-beam discharge and an arc discharge.

Discharges are created in different gases or gas mixtures. In the case of synthesis metal oxide nanomaterials, plasma is created in pure oxygen, or a mixture of oxygen and other gas(es), or oxygen-containing gas, such as water vapor, hydrogen peroxide or carbon and nitric oxides.

Gaseous discharges usually lead to formation of plasmas. In plasmas different gaseous radicals are formed. In oxygen plasma, molecules are excited to form the following radicals: positively and negatively charged atomic and molecular ions, neutral oxygen atoms in the ground as well as excited states, excited molecules and ozone. All radicals are suitable for synthesis metal oxide nanowires, but preferentially neutral oxygen atoms are used. Some other oxygen-containing radicals may also be used such as OH, CO, NO etc.

The radicals interact with the surface of a metal exposed to heavily non-equilibrium state of oxygen or oxygen-containing gas (thereafter: oxygen plasma). Nucleation sites of metal oxides are formed soon on the metal surface. Due to a high flux of oxygen radicals onto the surface, it may get over saturated with oxygen. This often causes diffusion of oxygen into bulk as well as diffusion of metal atoms towards the surface. As the diffusion is often one-dimensional, the oxides growing on the metals are also often one-dimensional. Long wires of metal oxides are often synthesized during exposure of a metal to oxygen plasma. Such one dimensional growth often occurs in metal exhibiting a BCC (»body-centered-cubic«) crystalline structure. Depending on the flux of plasma radicals onto the surface a variety of nanostructured oxides grow on the metal surface. The synthesis of one-dimensional nano structured oxides usually occurs in a limited range of plasma and other parameters, such as the substrate temperature.

Figure 1:
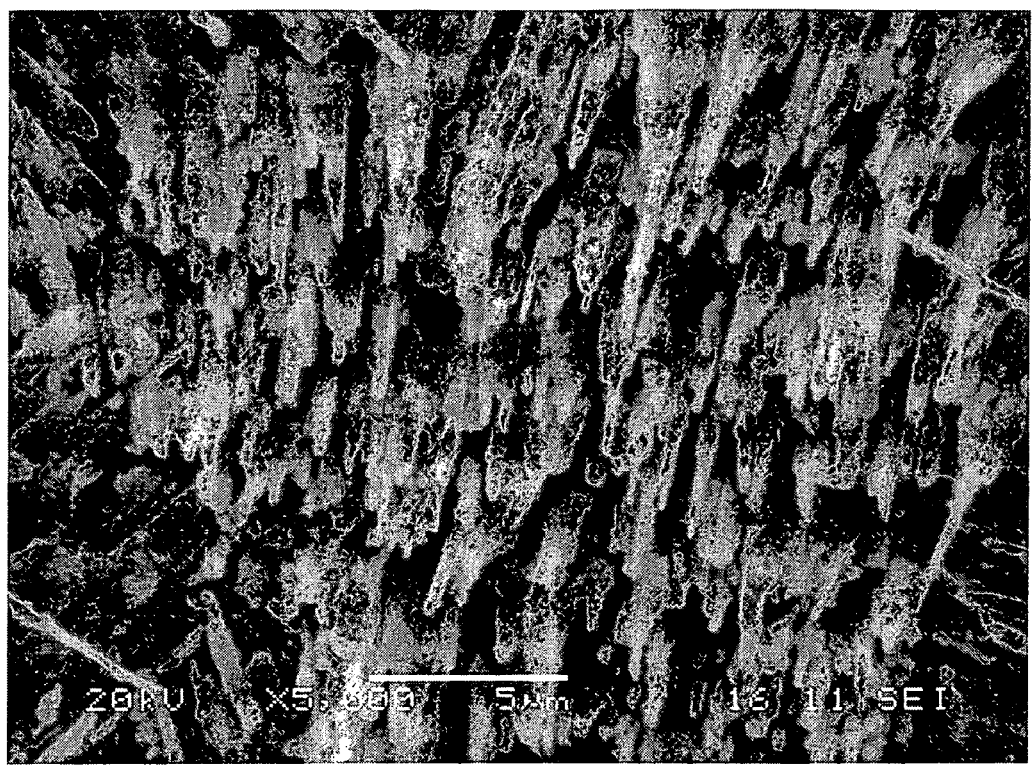
FIG. 1 SEM image of vanadium oxide nanowires.
Figure 2:
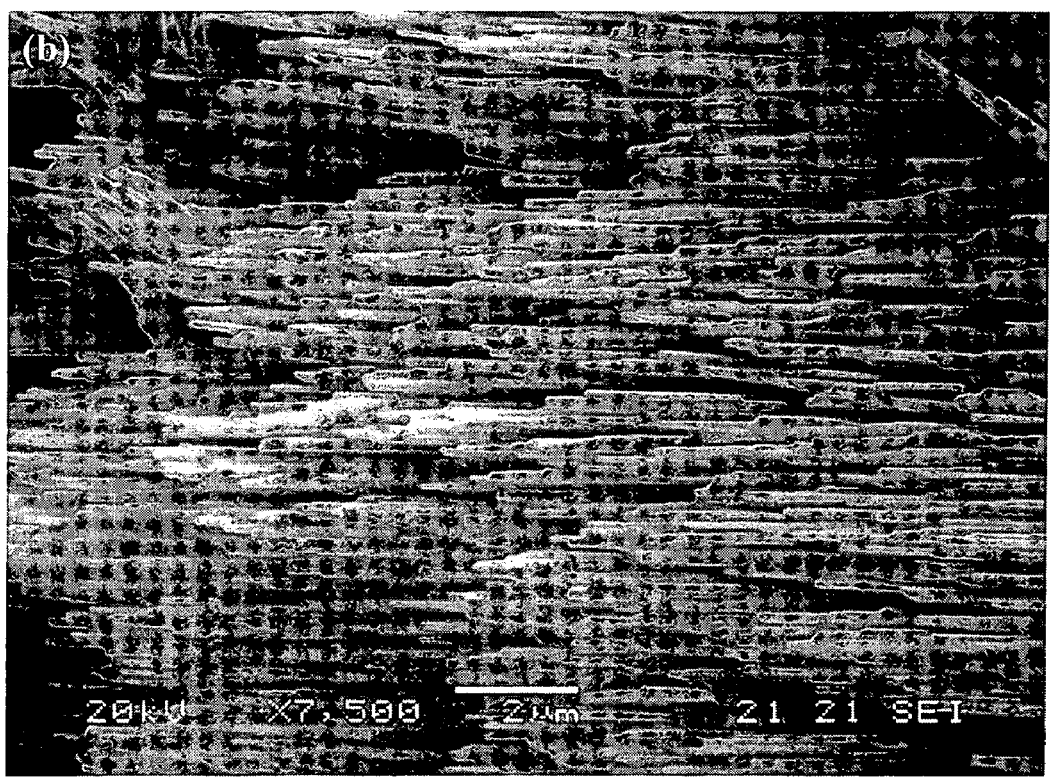
FIG. 2 SEM image of niobium oxide nanowires.
Figure 3:
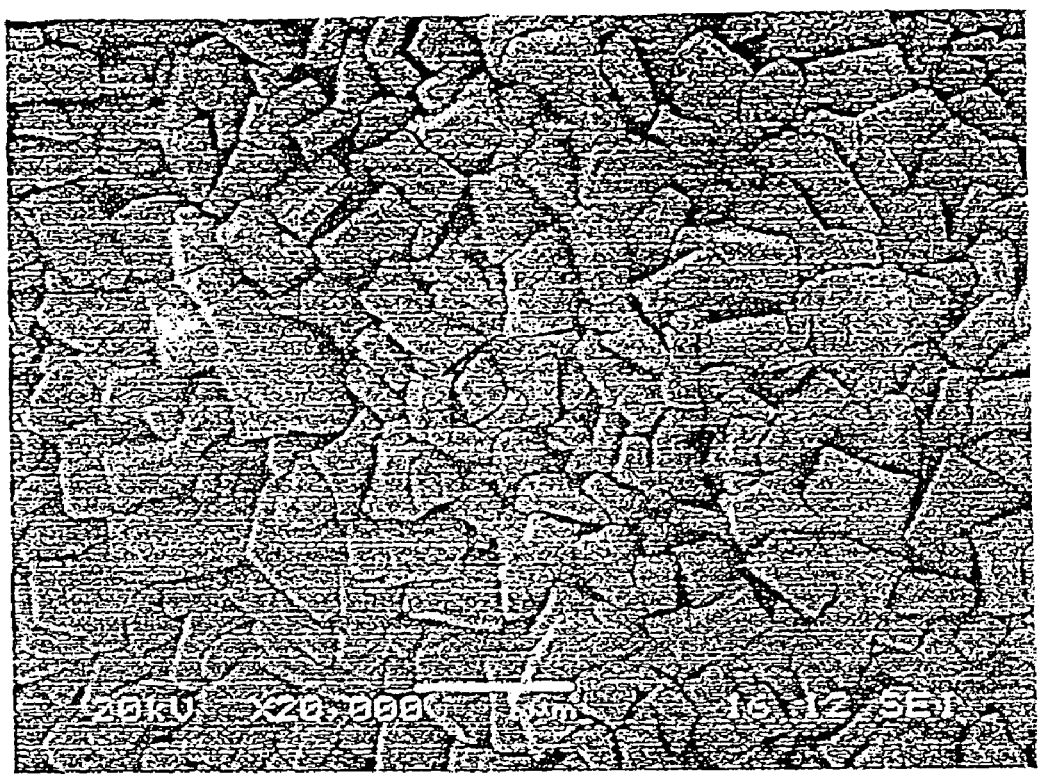
FIG. 3 SEM image of indium oxide nanoparticles.
Figure 4:
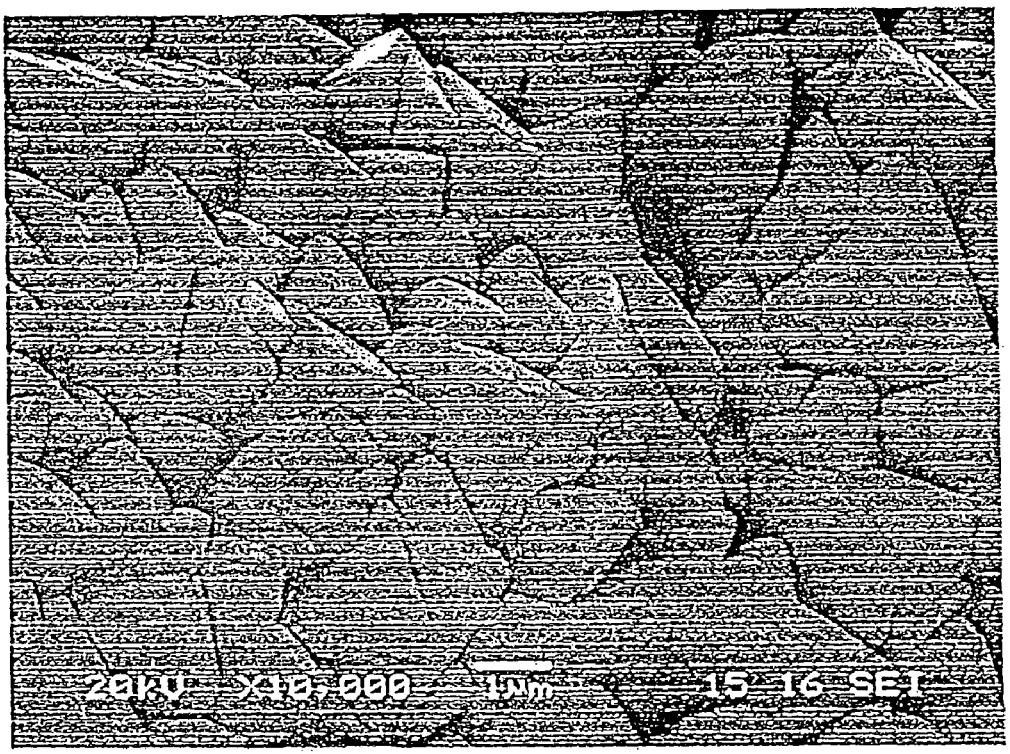
FIG. 4 SEM image of cadmium nanoparticles.

Examples of synthesis nanostructured metal oxides are described using the following figures: FIG. 1 shows a scanning electron microscope, ("SEM"), image of vanadium oxide nanowires, FIG. 2 shows a SEM image of niobium oxide nanowires, FIG. 3 shows a SEM image of indium oxide nanoparticles, FIG. 4 shows a SEM image of cadmium nanoparticles, and FIG. 5 shows a Schematics of the device for synthesis metal oxide nanoparticles.

More particularly, FIGS. 1, 2, 3, and 4 are SEM images of the surface of vanadium, niobium, indium, and cadmium, respectively, foil exposed to oxygen plasma. In the case of vanadium and niobium, the metal oxide particles are one-dimensional, while in the case of indium and cadmium, they are rectangular. The magnification is marked on each figure.

Figure 5:
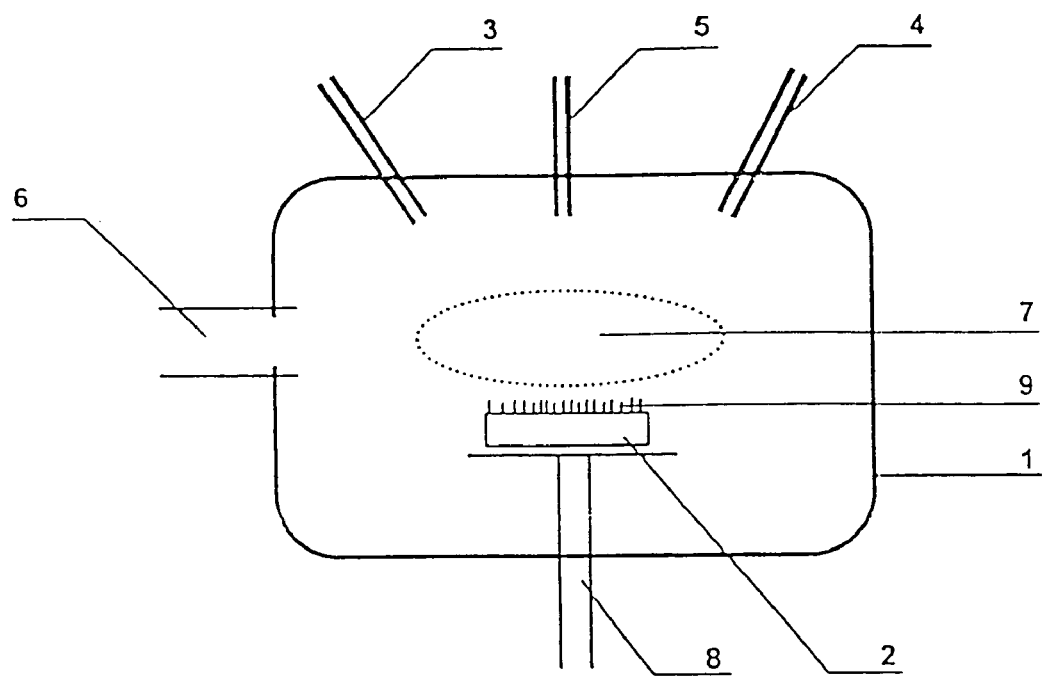
FIG. 5 Schematics of the device for synthesis metal oxide nanoparticles.

FIG. 5 is a schematic of the device for synthesis metal oxide nanoparticles. The process chamber 1 is equipped with three devices: an electron gun 3, an ion gun 4 and a laser 5. The process chamber 1 is also equipped with a source of gaseous radicals 6, which is preferentially a gaseous discharge, for instance a plasma torch, a glow discharge, a radio frequency or a microwave discharge. Plasma 7 may or may not be also created in a process chamber 1 with an appropriate plasma generator. The surface of the sample 2 facing the radical source 6 and/or plasma 7 may or may not be treated with the devices 3, 4, and 5. The sample cooling or heating. During the exposure of the Sample 2 radicals from source 6 and/or plasma 7, the synthesis of metal oxide nanomaterials occurs on the surface of the sample 2. The surface is soon covered with nanowires 9 or other form of metal oxide. Properties of the metal oxide nanoparticles 9 including the composition, structure, shape, and size, depend on different parameters, most important being the fluxes of different radicals onto the sample, and the sample temperature. The properties may also depend on the characteristics of the devices 3, 4, and 5, attached to the process chamber 1.

Large scale synthesis of nanowires in bulk quantities is essential not only to study the properties of materials on the nano scale, but also for their use in various applications such as composites, dispersions, catalysts, and bio-medial engineering. Predominantly, nanowires are synthesized using catalyst clusters in either the vapor phase or in a supercritical fluid phase or by using an oxide-assisted growth technique without catalyst clusters. Another prominent method employed is the use of low-melting metals for the bulk nucleation and synthesis of nanowires. The major drawback of these techniques is a slow growth rate—often on the order of a milligram per day. There were some attempts to synthesize metal oxide nanowires by directly heating metal foils in an oxygen atmosphere or by the chemical vapor transport of metal oxides, such as described in Applicants' U.S. Pat. No. 6,806,228 Oct. 19, 2004 and incorporated by reference herein, but the synthesis of nanowires using those methods requires relatively high temperatures. In order to overcome these limitations, we invented a method for the rapid synthesis of metal oxide nanowires directly from the solid phase at low temperature (~50° C.). Our approach is based upon the control of growing parameters by exposing metal foils to low-pressure, weakly ionized, fully dissociated, and cold oxygen plasma. Plasma is an excited gas state often obtained by passing electrical current through a gas. The gaseous molecules are rapidly ionized, dissociated, and excited by inelastic collisions with electrons, and the properties of the gas are changed dramatically. At room temperature, the internal energy of gaseous particles (i.e. average energy of excited states) easily reaches several electron volts (eV). The internal energy may be high enough to completely dissociate oxygen molecules. Materials facing such plasmas are therefore exposed to an extremely large flux of neutral oxygen atoms, often exceeding $10^{24} m^{-2} s^{-1}$. Oxygen atoms are extremely reactive and oxidize practically all materials. Since there is often no potential energy barrier, the oxidation mechanism in plasmas is completely different from classical oxidation.

Figure 6:
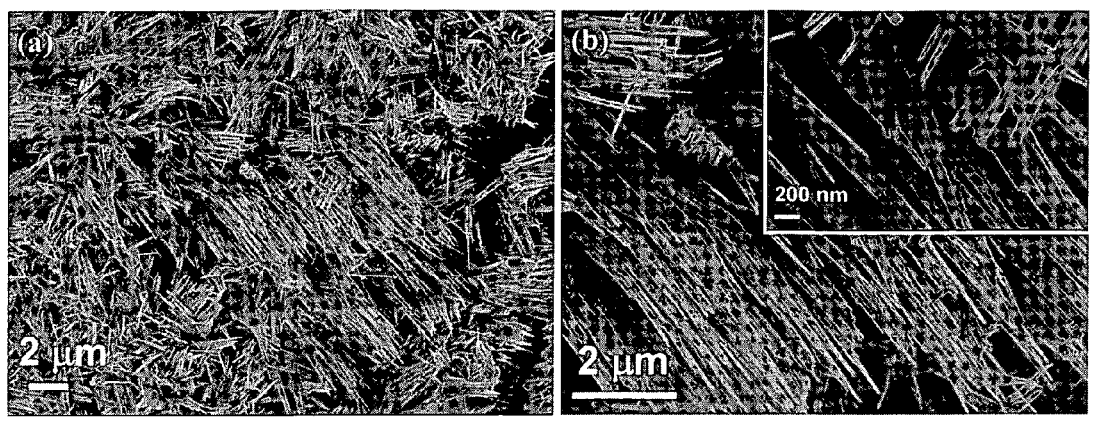
FIG. 6 SEM images of Nb2O5 nanowires grown on Nb foil during plasma treatment at high neutral oxygen atom density.

A niobium (Nb) foil 0.015 mm thick was exposed to oxygen plasma for 90 seconds. Plasma parameters were measured with Langmuir and catalytic probes [11] and were as follows: the electron temperature was about 60,000K, the ion density about $2 \cdot 10^{16} m^{-3}$, and the neutral oxygen atom density $6 \cdot 10^{21} m^{-3}$. The surface of the sample after plasma treatment was observed using a scanning electron microscope (SEM). The SEM images reveal interesting structures. The entire surface of the niobium foil was covered with bundles of nanowires with sub-millimeter lengths, as shown in FIG. 6*a*. The bundles consist of hundreds of well-oriented nanowires with cylindrical structures and similar, if not equal, diameters (FIG. 6*b*). Typical diameters of the nanowires are about 20 nm (FIG. 6*c*). The composition and phase of the nanowires were determined using Raman spectroscopy and transmission electron microscopy (TEM).

Figure 7:
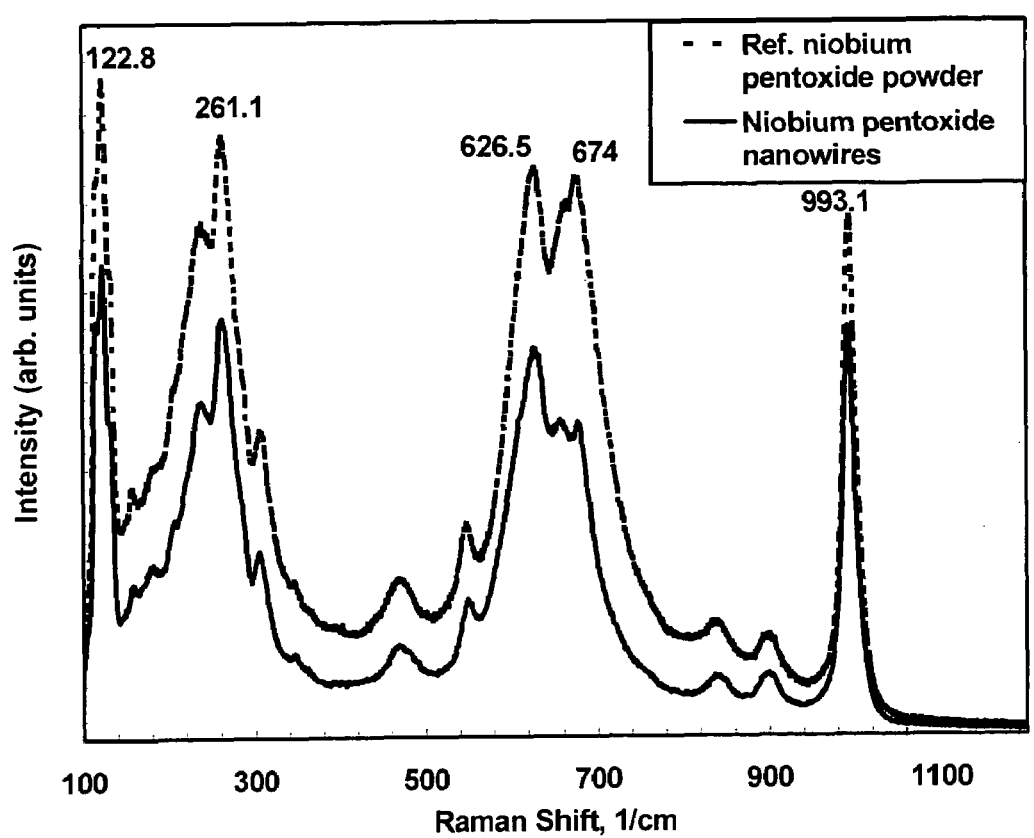
FIG. 7 Raman spectrum of the niobium oxide nanowires on bulk Nb foil synthesized using oxygen plasma.
Figure 8:
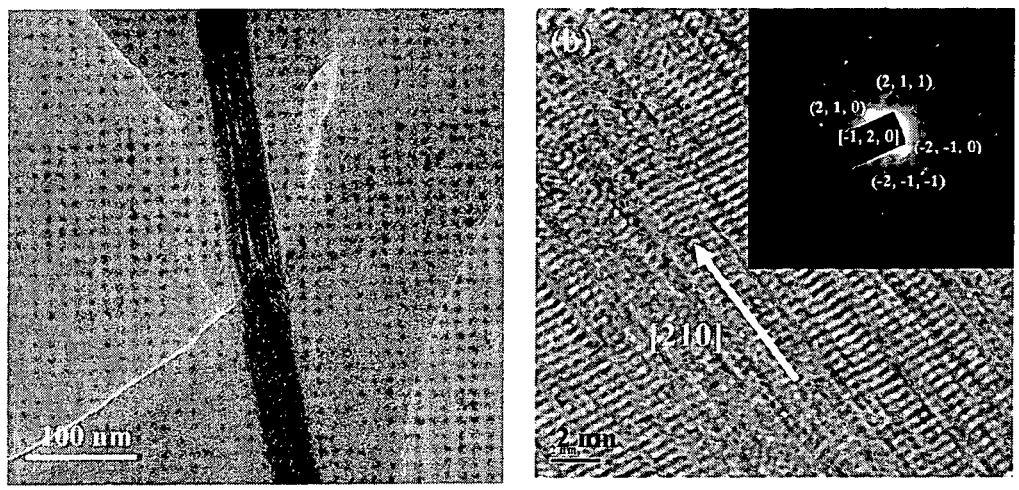
FIG. 8 TEM analysis of niobium oxide nanowire synthesized by exposing Nb foil to plasma composed of a high density of neutral oxygen atoms.

Chemical analysis of the bulk of the synthesized nanowires by Raman spectroscopy (FIG. 7) showed all peaks corresponding to $Nb_2O_5$, indicating that the nanowires are in fact composed of $Nb_2O_5$. A low magnification TEM image of an as-synthesized $Nb_2O_5$ nanowire is presented in FIG. 8(*a*). The high magnification TEM image in FIG. 8(*b*) shows that no amorphous sheathe surrounds the nanowires. The selected area diffraction (SAD) pattern of the nanowires presented in the inset of FIG. 8(*b*) clearly shows that the nanowire is monocrystalline $Nb_2O_5$ with a growth direction of [210].

Experiments were also performed in which Nb foils were exposed to oxygen plasmas with varying densities of neutral oxygen atoms and all other plasma parameters (such as the electron temperature, the ion density and treatment time) remaining the same. A couple of samples were exposed to plasma with an O density of $1.5 \cdot 10^{21} m^{-3}$. In this case, the O density was lower than that used in the previous experiments shown in FIGS. 1-3. The surface of such foils appears rather free of nanowires. A detailed view of the surface, however, reveals some interesting features. The formation of thick Nb2O5 crystal nuclei along with the initial stages of growth of nanowires was observed. More samples were exposed to oxygen plasmas with O concentrations below $1 \cdot 10^{21} m^{-3}$. In those cases, no traces of any nanowires were observed, and the surface remained flat even after prolonged plasma treatment.

Figure 9:
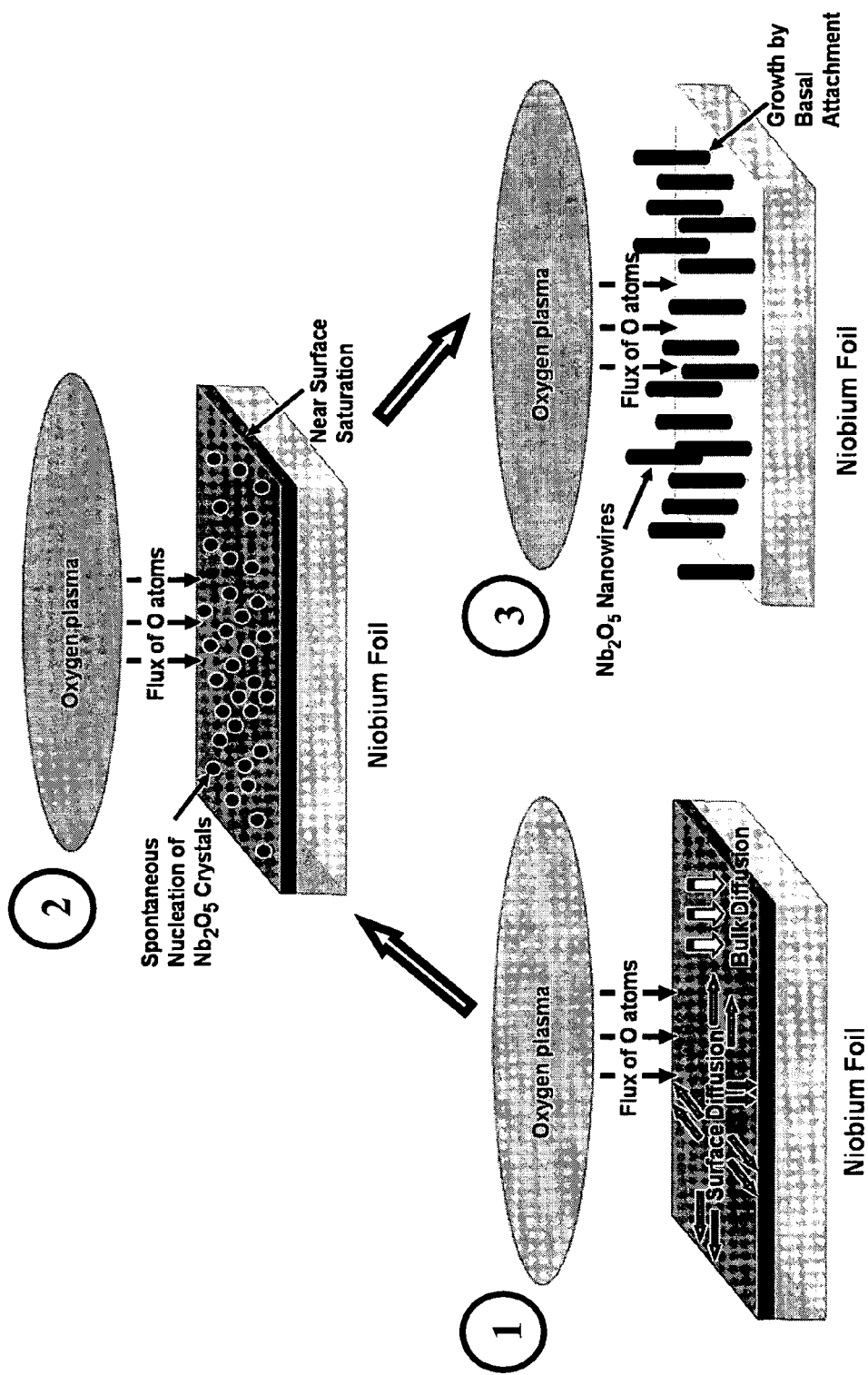
FIG. 9 Schematic representation of the growth mechanism involved for the formation of metal oxide nanowires from bulk material when exposed to highly dissociated oxygen plasma.
Figure 10:
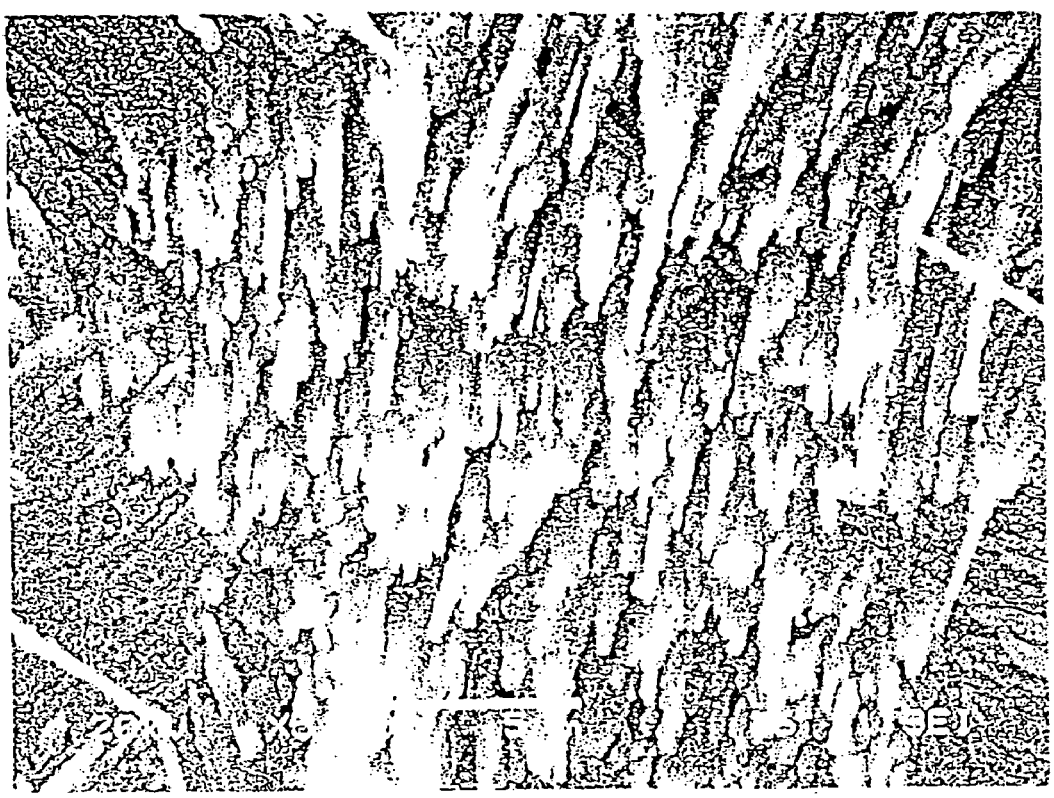
FIG. 10 SEM image of vanadium pentoxide nanowires.
Figure 11:
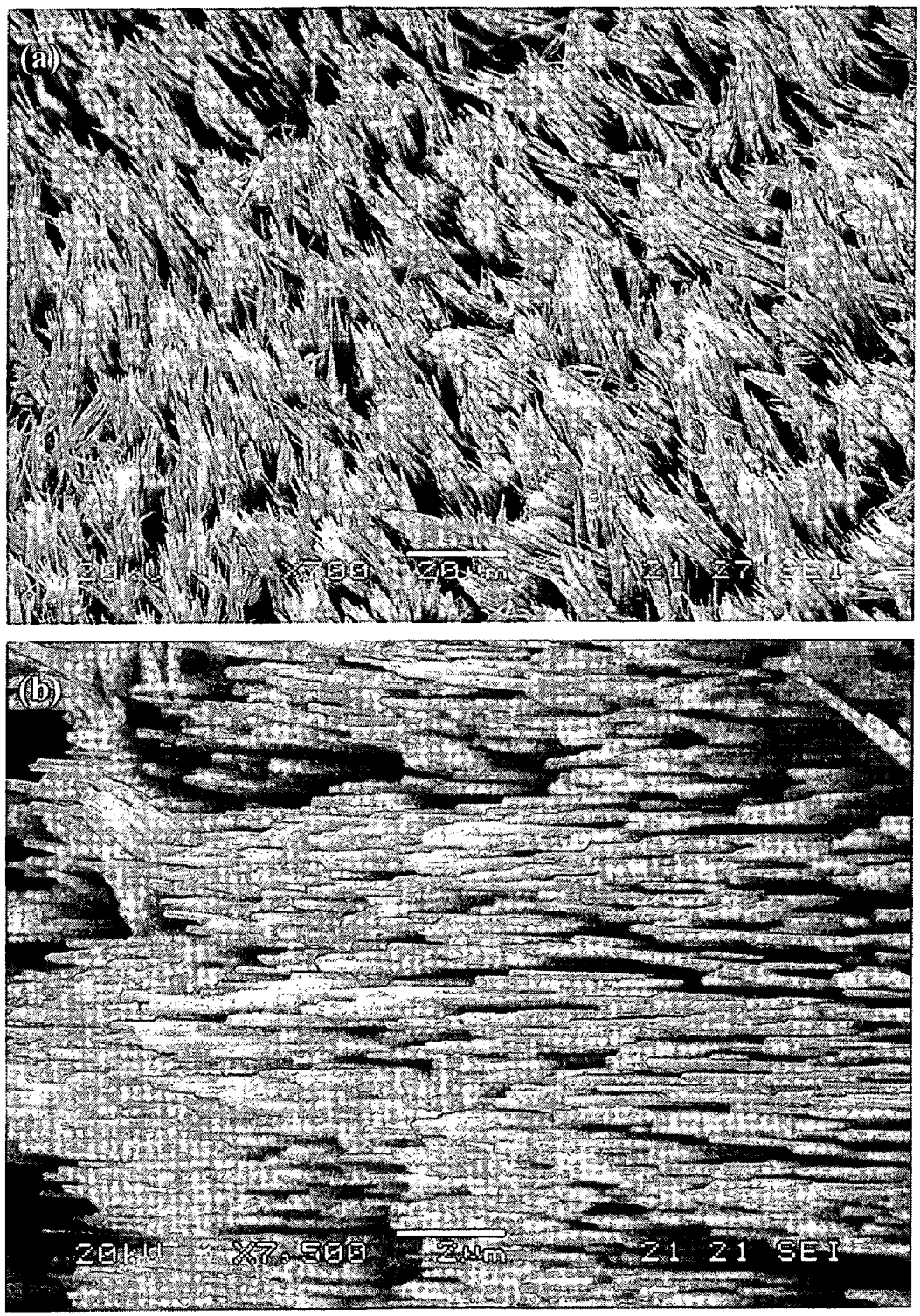
FIG. 11 SEM image of niobium oxide nanowires synthesized by plasma exposure high density of neutral oxygen atoms.
Figure 11C:
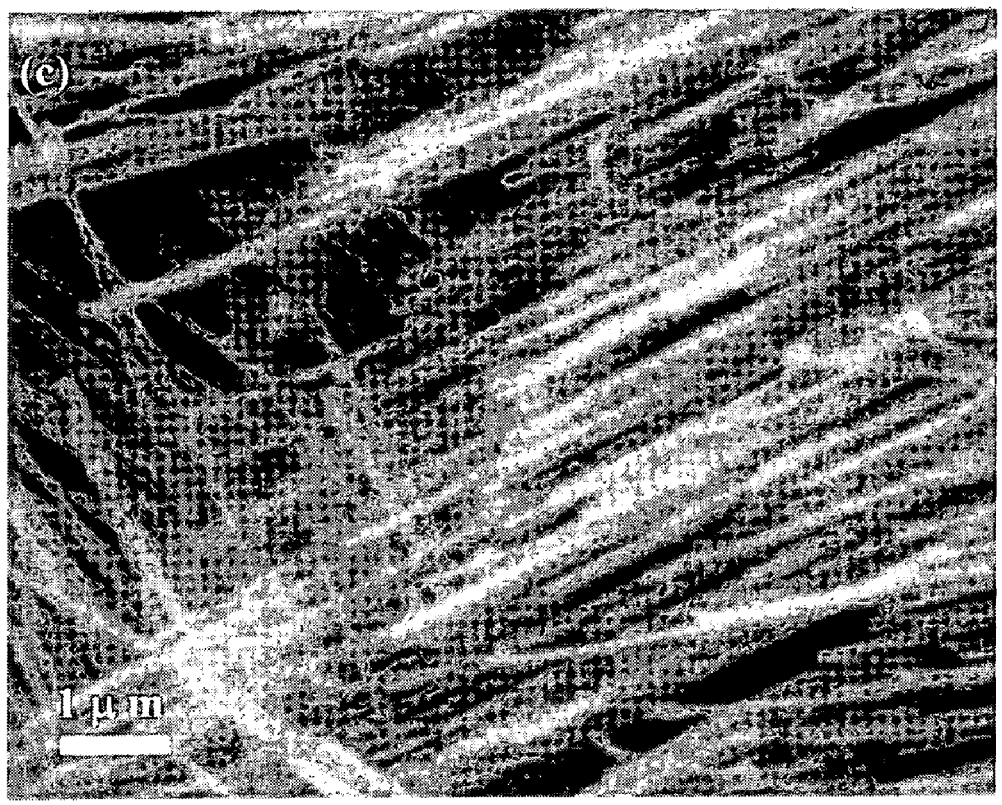
Figure 12:
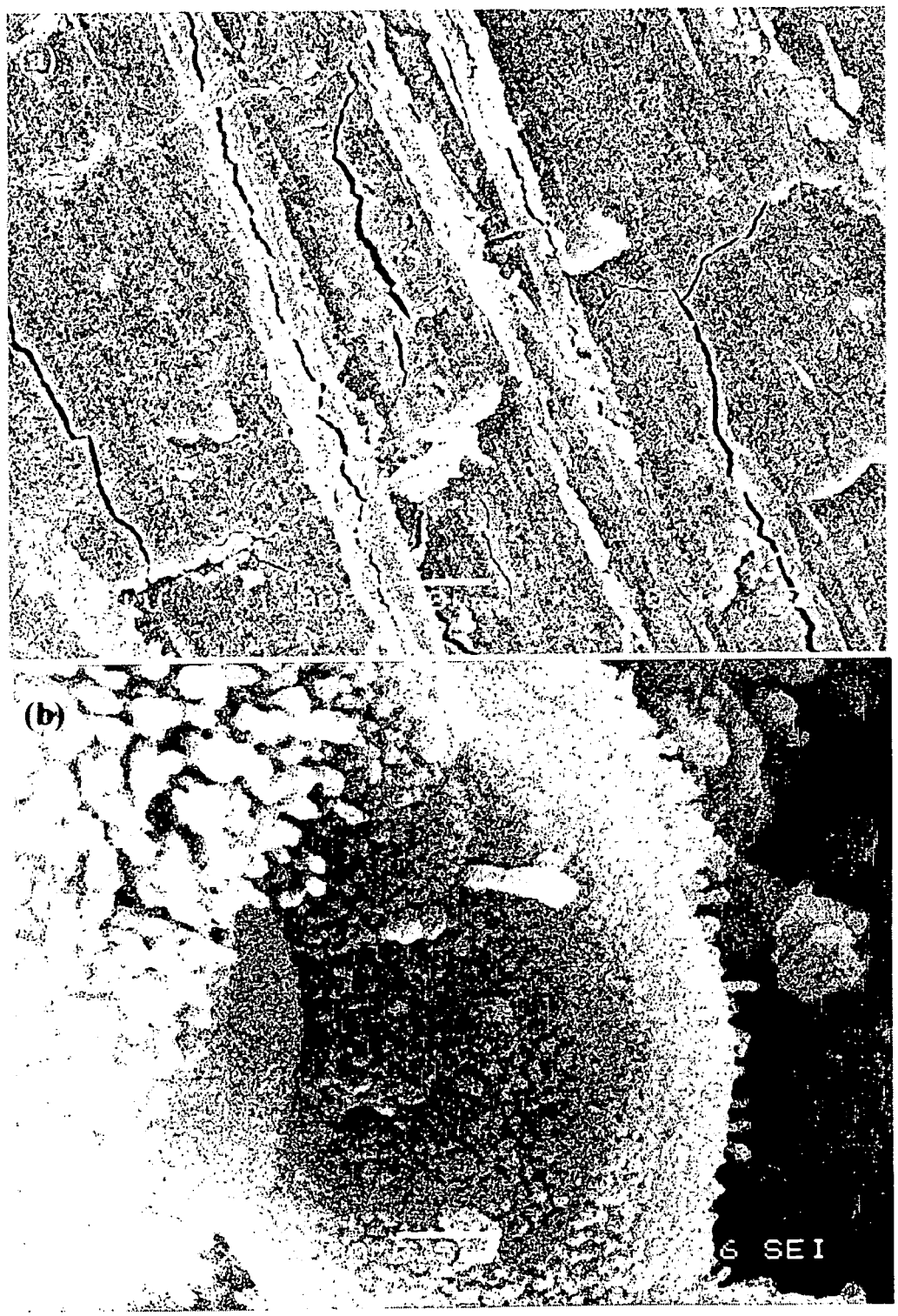
FIG. 12 SEM image of niobium oxide nanowires synthesized by plasma exposure low density of neutral oxygen atoms.
Figure 12C:
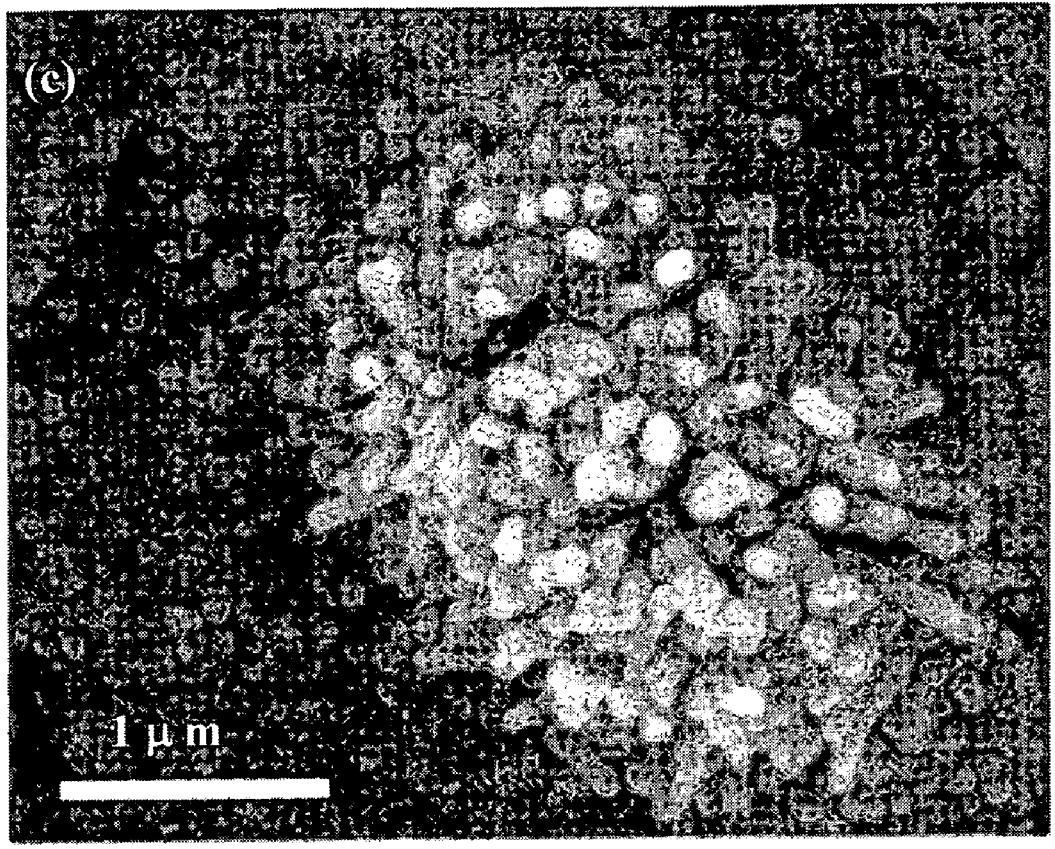
Figure 13:
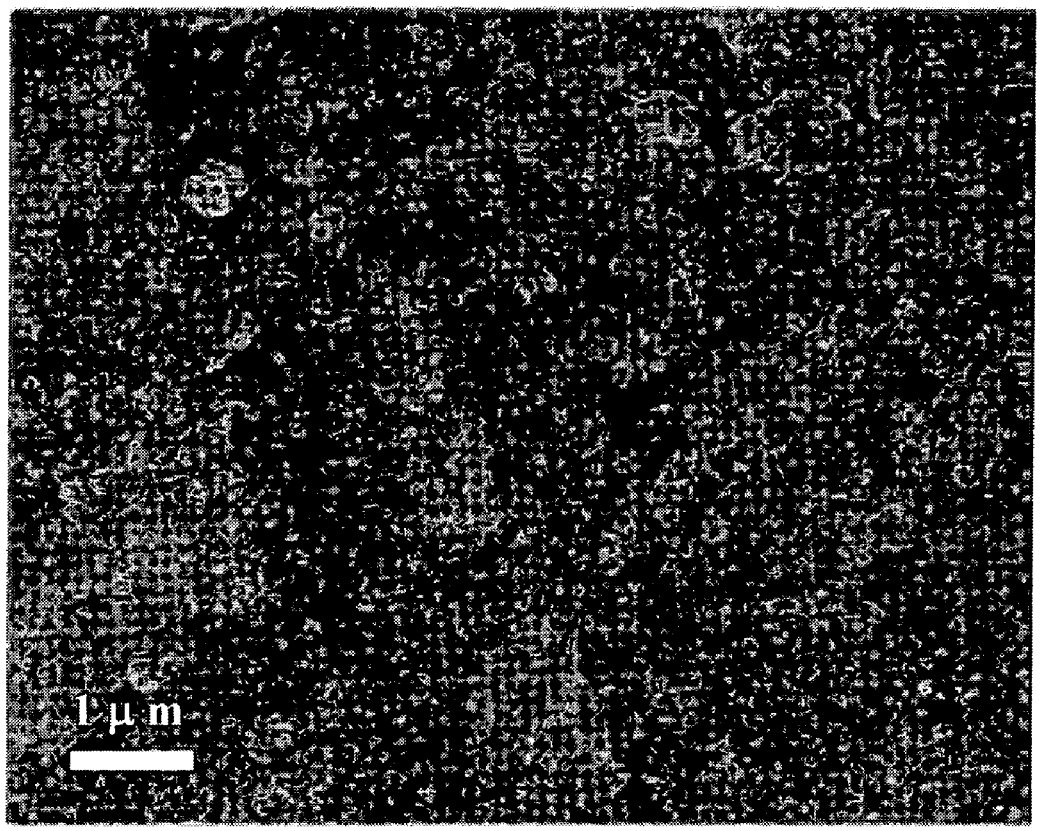
FIG. 13 SEM image showing surface of the Nb foil after plasma exposure at low density of neutral oxygen atoms.

The growth of nanowires on the surface of a niobium foil during plasma treatment can be explained as follows. When metal is exposed to weakly ionized, fully dissociated oxygen plasma, it is exposed to a flux of plasma radicals, positive ions, and atoms. The ions are accelerated in the sheath and bombard the surface of the foil with the kinetic energy obtained in the sheath (in our case approx. 20 eV). Ions typically damage the surface similar to metal sputtering, but the flux of ions in our experimental conditions was about 5 orders of magnitude lower than the flux of neutral atoms. The atoms are cold, so their interaction with the solid surface is purely potential. A schematic representation of how this interaction leads to the formation of nanowires is shown in FIG. 9 and is explained with the following steps:

1. Diffusion and dissolution of atomic oxygen from the gas phase into niobium metal (FIG. 9(a)).

2. Nucleation of niobium oxide on the surface, due to the supersaturation of the surface with oxygen (FIG. 9(b)).

3. Growth of niobium oxide nanowires from the bottom (basal growth) because of the constant supply of oxygen into the niobium metal. (FIG. 9(c)). Here, niobium is supplied only from the metal at the bottom, (since this process occurs at low temperature, there is no metal in the vapor phase) and oxygen is supplied from the vapor phase. This allows for the growth of niobium oxide only in the form of nanowires since niobium has a limited mobility (at low temperature (~50° C.)) and the niobium oxide formed has to attach at the base of the nuclei formed.

The synthesis of low melting metal oxide nanowires by the direct dissolution of oxygen into molten metal pools were disclosed in U.S. Pat. No. 7,182,812. Since the dissolution of oxygen in these metals is extremely low, supersaturation of the metal with oxygen led to the multiple nucleation and growth of nanowires from molten metal droplets. The exposure of $O_2/H_2$ plasma at modest temperatures (400-500° C.) typically led to bulk saturation of molten metals and the nucleated crystals grew vertically with basal attachment into 1-D structures. However, in this work, the dissolution of oxygen into niobium should lead to supersaturation of only sub-surface and not the entire bulk of metal foil due to low temperatures, short duration of exposure, and high flux of O atoms. The supersaturation of the Nb subsurface layers due to the influx of atomic oxygen leads to spontaneous nucleation of nanometer scale $Nb_2O_5$ crystals. The limited mobility of Nb at low temperatures makes the nuclei grow vertically with basal attachments of Nb and O similar to our earlier experiments with molten metals. (FIG. 10, FIG. 11, FIG. 12, and FIG. 13)

By altering the experimental conditions, it was determined that the most important parameter was the density of neutral oxygen atoms in plasma. The $Nb_2O_5$ nanowires grow only when the oxygen atom concentration exceeds about $2 \cdot 10^{21}$ $m^{-3}$. Application of the technique to other metals and synthesized nanowires of $V_2O_5$. It is anticipated that this technique works for other metals, such as tantalum and iron, as well. However, the oxygen atom density window differs from one material to the next. In addition to oxides, this nanowire synthesis method has widespread applicability to other metal systems such as: nitrides, sulfides, phophides, arsenides, other alloys, etc.

$Nb_2O_5$ nanowires may have applications in future field emission displays as well as in microelectronics. Unlike other synthesis methods, where nanomaterials take a long time to grow, $Nb_2O_5$ and other metal oxide nanowires produced via cold plasma treatment grow rather rapidly. Under our experimental conditions, the entire foil (20×4 $mm^2$) was covered with nanowires in just 90 seconds. Therefore, our approach may be interesting for industrial scale production.

Nanowires were synthesized directly from the solid state during the exposure of Nb foil to oxygen plasma. High purity Nb foil 0.15 mm thick was cut into rectangular pieces approximately 20×4 $mm^2$ and exposed to highly dissociated, weakly ionized oxygen plasma created in a high frequency discharge. The electron temperature was about 5 eV, the ion density about $2 \cdot 10^{16} m^{-3}$, and the neutral oxygen atom density $6 \cdot 10^{21} m^{-3}$. The foil samples were left in the plasma for 90 seconds. After the plasma treatment, the samples were analyzed using scanning electron microscopy (SEM), Raman spectroscopy and transmission electron microscopy (TEM).

The experimental plasma reactor currently has a production capacity of about 10 mg of $Nb_2O_5$ nanowires per hour. An optimized plasma reactor would enable an increase in production rate by at least two orders of magnitude.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A method for synthesis of a metal oxide nanomaterial, the method comprising the steps of:

selecting a metal substrate;

creating a non-equilibrium gas comprising oxygen plasma at a low temperature at the point of the surface of the metal substrate of between about 50° C. and the temperature of the boiling point of the metal substrate;

exposing said metal substrate to said oxygen plasma having a neutral oxygen atom density of at least about $1 \times 10^{21} m^{-3}$ for nucleation of a metal oxide on a surface of said metal substrate;

forming the nanomaterial comprising a metal oxide nanostructure from the metal oxide on the surface of said metal substrate; and controlling and maximizing the growth rate of said metal oxide nanostructure on said metal substrate by optimizing the density of said neutral oxygen atoms in said oxygen plasma.

2. The method defined in claim 1, wherein said metal substrate is substituted with two or more metals substrates or their alloys.

3. The method defined in claim 1, wherein said oxygen plasma is generated in any kind of gaseous discharge including the DC, the radio frequency, plasma reactor, and the microwave discharge in any gas or gas mixture, preferably in oxygen, ozone, water vapor, hydrogen peroxide, air, carbon oxides, or any mixture of gases, or a mixture of gases with a noble gas.

4. The method defined in claim 1, wherein the temperature of said metal substrate is between room temperature and the boiling point of said metal substrate.

5. The method of claim 1, further comprising the step of adjusting the temperature of the method by either by cooling or heating a substrate holder, and/or by treatment of said metal substrate with an electron gun, an ion gun or a laser.

6. The method defined in claim 1, wherein during said metal substrate treatment with said oxygen plasma there is a temperature gradient between the surface of said selected metal substrate facing said oxygen plasma and a surface of said metal substrate facing a sample holder and the temperature of the surface of said metal substrate facing said sample holder is lower than the temperature of the surface of said metal substrate facing said oxygen plasma.

7. The method defined in claim 1, wherein the said metal substrate is selected from a group consisting of vanadium and niobium.

8. The method defined in claim 1, wherein said metal oxide nanostructure forms nanowires having a crystalline structure of the metal substrate.

9. A method for synthesis of metal oxide nanoparticles, comprising the steps of:
- selecting a metal substrate;
- heating said metal substrate at a temperature between about 50° C. and the temperature of the boiling point of said metal substrate taken at the surface of said metal substrate;
- exposing said metal substrate to an oxygen plasma having a neutral oxygen atom density of at about least $1\times10^{21} m^{-3}$, for;
- forming metal oxide crystal nanoparticles in layers from nucleation of a metal oxide on a surface of said metal substrate; and
- controlling and maximizing the growth rate of said metal oxide crystal nanoparticles by optimizing the neutral oxygen atom density in said oxygen plasma.

10. The method of claim 9, wherein said oxygen plasma is generated in any kind of gaseous discharge including DC, the ratio frequency, and the microwave discharge in any gas or gas mixture, selected from the group consisting of oxygen, ozone, water vapor, hydrogen peroxide, air, carbon oxides, or any mixture of the gases, or a mixture of gases with a noble gas.

11. A method for synthesis of a metal oxide nanomaterial, the method comprising the steps of:
- selecting a metal substrate;
- exposing said metal substrate to an oxygen plasma having a neutral oxygen atom density of at least about $1\times10^{21} m^{-3}$ for nucleation of a metal oxide on a surface of said metal substrate, said oxygen plasma having a temperature range at the point of the surface of the metal substrate of between about 50° C. and a boiling point of said metal substrate; and
- forming the nanomaterial comprising a metal oxide nanostructure from the metal oxide on the surface of said metal substrate.

12. The method defined in claim 11, wherein said metal substrate is substituted with two or more metals or their alloys.

13. The method defined in claim 11, wherein the temperature of said metal substrate is between room temperature and the boiling point of said metal substrate.

14. The method of claim 11, further comprising the step of adjusting the temperature of the method by either by cooling or heating a substrate holder, or by treatment of said metal substrate with an electron gun, an ion gun, or a laser.

15. The method defined in claim 11, wherein during the step of exposing said metal substrate with said oxygen plasma there is a temperature gradient between the surface of said selected metal substrate facing said oxygen plasma and a surface of said metal substrate facing a sample holder, and the temperature of the surface of said metal substrate facing said sample holder is lower than the temperature of the surface of said metal substrate facing said oxygen plasma.

16. The method defined in claim 11, wherein said metal substrate is selected from a group consisting of vanadium and niobium.

17. The method defined in claim 11, wherein said metal oxide nanostructure forms nanowires having a crystalline structure of said metal substrate.

18. The method defined in claim 11, wherein said metal substrate is exposed to said oxygen plasma for approximately 90 seconds.

\* \* \* \* \*

UNITED STATES PATENT AND TRADEMARK OFFICE
CERTIFICATE OF CORRECTION

PATENT NO. : 7,591,897 B2  Page 1 of 1
APPLICATION NO. : 11/385015
DATED : September 22, 2009
INVENTOR(S) : Sunkara et al.

It is certified that error appears in the above-identified patent and that said Letters Patent is hereby corrected as shown below:

In claim 7, col. 8, line 60: delete the word "the" between "wherein" and "said".

In claim 9, col. 9, line 9: delete the phrase "of at about least" and add --of at least about--.

In claim 15, col. 10, line 15: add a --,-- after the word "plasma".

Signed and Sealed this

Third Day of November, 2009

David J. Kappos
*Director of the United States Patent and Trademark Office*